United States Patent [19]

Borth et al.

[11] Patent Number: 4,873,683
[45] Date of Patent: Oct. 10, 1989

[54] TDMA RADIO SYSTEM EMPLOYING BPSK SYNCHRONIZATION FOR QPSK SIGNALS SUBJECT TO RANDOM PHASE VARIATION AND MULTIPATH FADING

[75] Inventors: David E. Borth, Palatine; Chih-Fei Wang, Arlington Heights; Duane C. Rabe, Rolling Meadows; Gerald P. Labedz, Chicago, all of Ill.

[73] Assignee: Motorola, Inc., Schaumburg, Ill.

[21] Appl. No.: 128,677

[22] Filed: Dec. 4, 1987

[51] Int. Cl.$^4$ ............................ H04J 3/16; H04B 1/10
[52] U.S. Cl. ............................... 370/95.1; 370/100.1; 370/104.1; 375/15; 375/57; 375/101
[58] Field of Search ..................... 375/13, 14, 15, 54, 375/57, 101; 370/95, 104, 110.1, 100; 455/65

[56] References Cited

U.S. PATENT DOCUMENTS

| | | | |
|---|---|---|---|
| 3,537,008 | 10/1970 | Lakatos | 455/65 |
| 3,617,889 | 11/1971 | Rabinowitz | 455/65 |
| 4,227,152 | 10/1980 | Godard et al. | 375/13 |
| 4,267,591 | 5/1981 | Wissel et al. | 375/54 |
| 4,349,915 | 9/1982 | Costas | 455/65 |
| 4,587,662 | 5/1986 | Langewellpott . | |
| 4,597,089 | 6/1986 | Motley et al. | 375/15 |
| 4,606,051 | 8/1986 | Crabtree et al. . | |
| 4,628,517 | 12/1986 | Schwarz et al. . | |
| 4,669,091 | 5/1987 | Nossen . | |
| 4,669,092 | 5/1987 | Sari et al. . | |
| 4,672,638 | 6/1987 | Taguchi et al. . | |

FOREIGN PATENT DOCUMENTS 0174125 3/1986 European Pat. Off. .
0184018 6/1986 European Pat. Off. .

OTHER PUBLICATIONS

Price et al.; "A Communication Technique for Multipath Channels", Proceedings of the IRE; vol. 46, Mar. 1958; pp. 555-570.
Turin; "Introduction to Spread-Spectrum Antimultipath Techniques and Their Application to Urban Digital Radio", Proceedings of the IEEE; vol. 68, No. 3, Mar. 1980; pp. 328-353.
Eckert et al; "The Fully Digital Cellular Radiotelephone System CD900"; Nordic Seminar on Digital Land Mobile Radiocommunication; Feb. 5-7, 1985, Espoo, Finland; pp. 249-259.
Langewellpott et al.,; "Performance Analysis of Radio Transmission in the Fully Digital Cellular Radio System CD900"; Nordic Seminar on Digital Land Mobile Radiocommunications; Feb. 5-7, 1985, Espoo, Finland; pp. 261-269.
Leuenberger; "Digital Radio Systems Examined-Part I, General State of the Art"; MSN & CT; vol. 16, No. 1; Jan. 1986; pp. 81-92.
Raith et al.; "Multi-path Equalization for Digital Cellular Radio Operating at 300 KBit/S", 36th IEEE VTG Conference, Jun. 1986; pp. 268-272.
Stjernvall et al.; "Radio Test Performance of a Narrowband TDMA System"; 37th IEEE VTG Conference; Jun. 1-3, 1987; pp. 293-299.
Stjernvall et al.; "Radio Test Performance of a Narrowband TDMA System-DMS 90"; International Conference on Digital Land Mobile Radio Communications; Venice; Jun. 30-Jul. 3, 1987; pp. 310-317.
Kammeyer; "Equalization Problems in a Digital FM Receiver"; Signal Processing vol. 9, No. 4; Dec. 1985; pp. 263-276.

Primary Examiner—Douglas W. Olms
Assistant Examiner—Wellington Chin
Attorney, Agent, or Firm—Raymond A. Jenski; Rolland R. Hackbart

[57] ABSTRACT

A time division multiple access (TDMA) radio system conveying a quadrature phase shift keying (QPSK) modulated data signal is disclosed. In order to overcome multipath distortion and phase variation introduced by the radio channel, a synchronizing poriton of a TDMA timeslot is transmitted in only one vector of the QPSK modulation. The system utilizes the one vector synchronizing portion to develop a channel profile estimate which is applied to the received message portion of the QPSK data signal to compensate for the multipath distortion and phase variation during one TDMA timeslot.

13 Claims, 6 Drawing Sheets

TDMA RADIO SYSTEM EMPLOYING BPSK SYNCHRONIZATION FOR QPSK SIGNALS SUBJECT TO RANDOM PHASE VARIATION AND MULTIPATH FADING

BACKGROUND OF THE INVENTION

This invention relates generally to digital radio systems and more specifically to a system transmitting, receiving, and demodulating TDMA QPSK modulation in a multipath fading environment such as an environment where the transceivers may be in motion and are served from fixed site transmitters and receivers such as in a radiotelephone system. This invention is related to instant assignee's U.S. patent application Ser. Nos. (128,975) "Rapid Reference Acquisition and Phase Error Compensation for Radio Transmission of Data", filed on behalf of Labedz et al. and (129,976) "Phase-Coherent TDMA Quadrature Receiver for Multipath Fading Channels", filed on behalf of Borth et al. on the same date as the present invention and containing related subject matter.

In a typical environment, a UHF or microwave radio channel exhibits a multipath structure in addition to Rayleigh fading. Thus, a radio transceiver for a mobile or portable TDMA system operating at high data rates must accommodate reception of multiple replicas of the transmitted signal, each with a random magnitude, phase, and time delay with respect to the transmitted signal. Without corrective measures, the data message can be obliterated by the multipath signals. As early as 1958, a receiver capable of accommodating these impairments was described for the use of either Differential Binary Phase-Shift Keying (DBPSK) or noncoherent Frequency-Shift Keying (FSK). It employed a channel sounding method to estimate the channel impulse response or channel profile, and a transversal equalizer having taps which were adjusted in response to the estimated channel profile.

By 1960 the multipath channel had been exhaustively studied and simulated, and optimum reception had been defined, but largely avoiding phase coherent techniques. Such demodulation techniques do not permit the use of higher spectral efficiency modulation methods which employ two-dimensional signaling techniques such as shaped Quadrature Phase-Shift Keying (QPSK) and its variations.

By 1983, TDMA (Time Division Multiple Access) receivers for digital telephony using Binary Phase-Shift Keying (BPSK) phase coherent detection had been described in U.S. Pat. No. 4,587,662. In 1985 this was extended to include QPSK, but the receiver was only described in general terms.

In 1986 an MSK receiver, with possible application to QPSK, was reported which could accommodate two rays of multipath and which used an adaptive equalizer employing both feedforward and feedback filtering. (See Krister Raith et al., "Multi-Path Equilization for Digital Cellular Radio Operating at 300 kbits/s", 36th IEEE Vehicular Conference, pp.268–272, May 1986). Although this adaptive equalizer apparently has never been thoroughly described in the literature, it is different than the multipath correlation employed in the present invention since it requires decisions to be made on the output in order to adjust the equalizer.

Adaptive equalization generally operating continuously on the data being received has been utilized in digital microwave receivers receiving continuous data streams. Such continuous receivers can equalize over a relatively long period of time. TDMA, due to its burst-like characteristics, demands rapid determination of the channel profile including the significant multipath contributions. Even though the data transceiver may be moving, the channel profile can be assumed to undergo negligible changes in a given TDMA timeslot if the timeslot is sufficiently short in duration.

SUMMARY OF THE INVENTION

Therefore, it is one object of the present invention to synchronize a TDMA receiver to a synchronization sequence transmitted during a timeslot to compensate for multipath signals and random phase introduced by a radio channel to transmitted digital information.

It is another object of the present invention to transmit the synchronization sequence on a single vector of the QPSK modulated signal.

It is a further object of the present invention to create a radio channel multipath profile from the synchronization sequence and utilize that model during only one timeslot period.

Accordingly, these and other objects are achieved in the present invention which encompasses a time division multiple access (TDMA) radio system which conveys a data message using quadrature phase shift keying (QPSK) modulation and a synchronization sequence in a timeslot over a radio channel. The transmitter transmits the synchronization sequence in only one vector of the QPSK modulation and the receiver receives and employs the one vector synchronization to compensate the data message for multipath and phase variation during one TDMA timeslot.

DESCRIPTION OF THE PREFERRED EMBODIMENT

Figure 1:
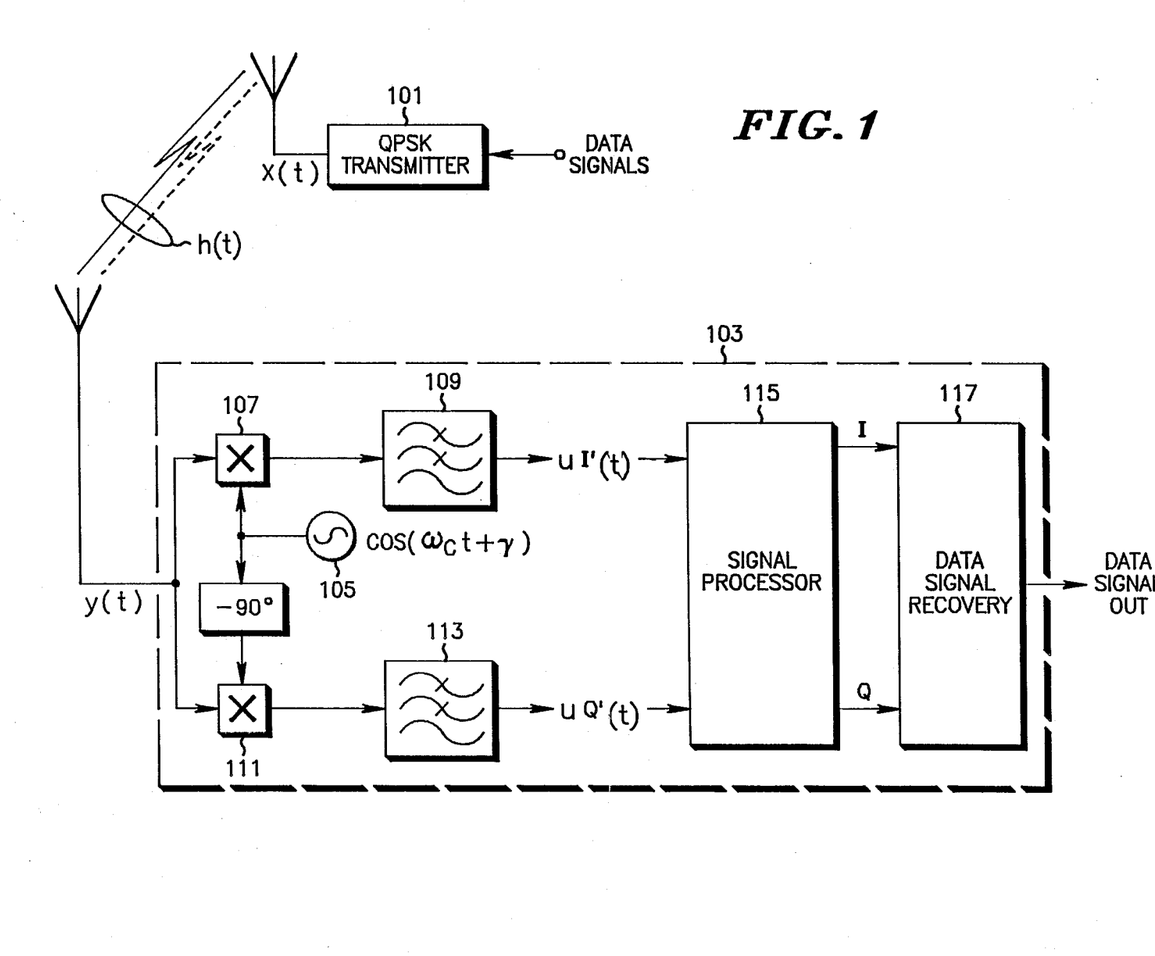
FIG. 1 a block diagram of a data transmission system employing quadrature digital transmission and reception.

A radio frequency system conveying a data signal from a transmitter 101 to a receiver 103 is shown in FIG. 1. In a radiotelephone system, transmitter 101 would be a fixed site transmitter serving a radio coverage area which would be populated by mobile or portable transceivers, the receiver of which is shown as receiver 103. Additionally, more than one radio coverage area can be linked in such a way that continuous coverage may be provided over a wide area, i.e., a cellular radiotelephone system or an integrated area such as an office building or shopping mall. (See, for example, instant assignee's U.S. Pat. application No. 44,920 "Microcellular Communications System Using Macrodiversity" filed on behalf of Gerald P. Labedz on May 1, 1987).

In the preferred embodiment, quadrature phase shift keying (QPSK) is employed to increase the throughout of the channel although other multi-dimensional signaling may equivalently be employed. Further, the well-known time division multiple access (TDMA) technique of sharing a limited channel resource among a large number of users is employed in the present invention. Each of the users is assigned a brief period of time (a timeslot) during which a message may be transmitted to or received from the user. The advantages of such a TDMA technique over other techniques (such as frequency division multiple access TDMA) are: (a) no duplexer is required for full duplex communications, (b) variable data rate transmission may be accommodated through the use of multiple adjacent time slots, (c) a common radio frequency power amplifier may be used to amplify multiple channels at any power level without the combining losses or intermodulation distortion present with FDMA, and (d) a capability of scanning other "channels" (timeslots) without requiring separate receivers may be provided.

The high data rate employed in the present invention (200 Kbps to 2 Mbps) exceeds the channel coherence bandwidth of the mobile radio channel for many urban and suburban environments. As a result, the channel exhibits a multipath structure in addition to the expected Rayleigh fading. The receiver of the present invention enables TDMA quadrature signals to be coherently received over a multipath fading channel. This embodiment will demodulate a 2-megachip/sec QPSK radio signal, the only constraint being that the acquisition sequence be transmitted as a binary phase shift keying (BPSK) signal with a predetermined phase relative to the QPSK data.

Figure 2A:
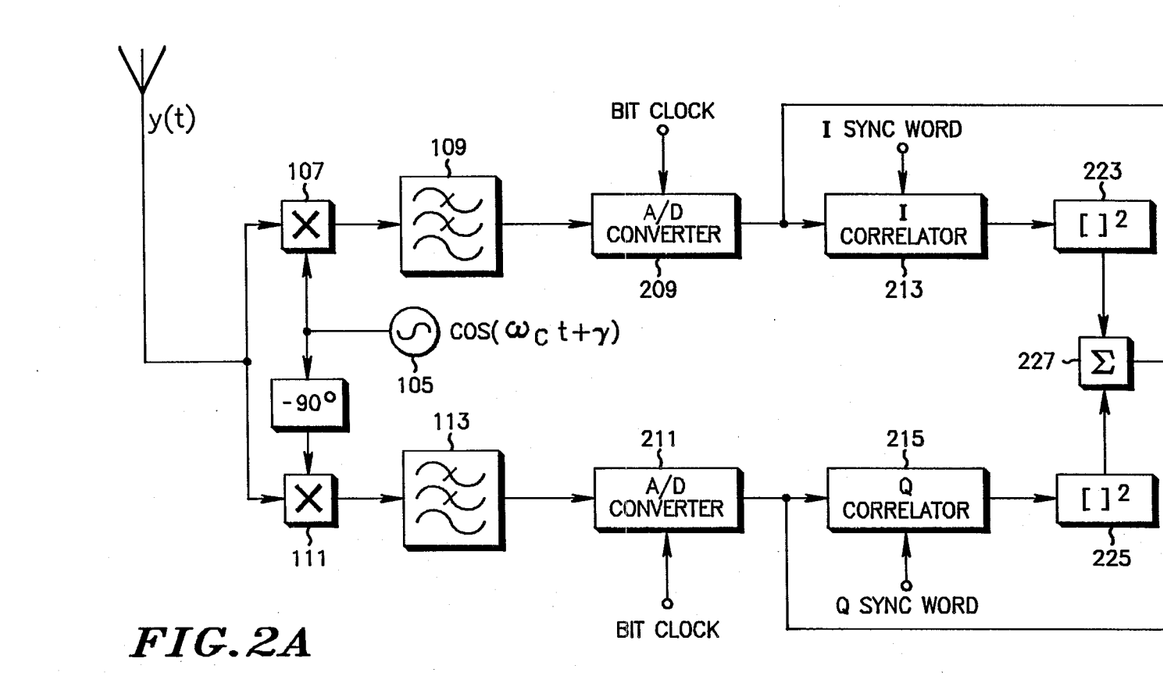
FIGS. 2A and 2B are, together, a block diagram of a TDMA receiver which may receive QPSK signals.
Figure 2B:
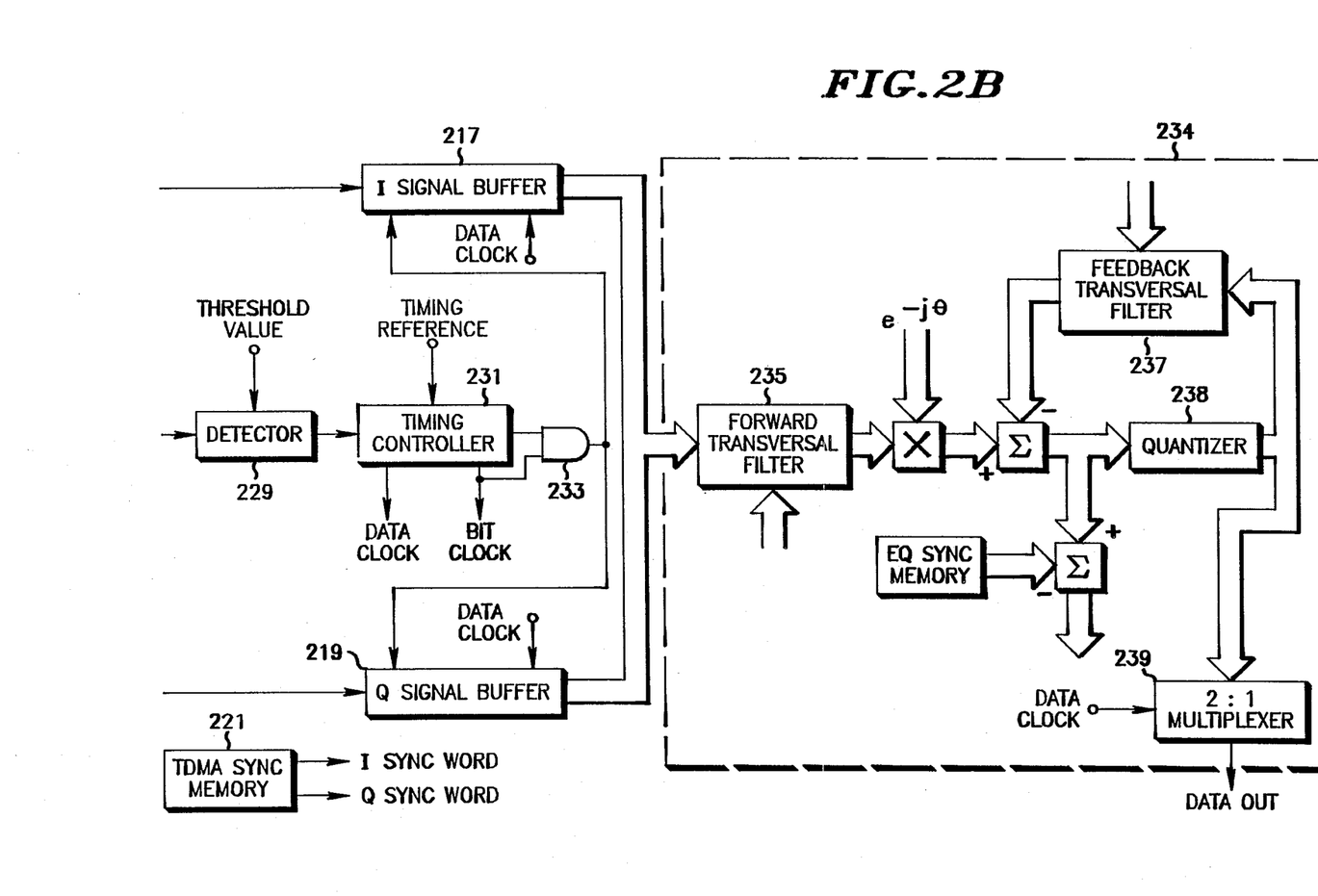

FIGS. 2A and 2B are a block diagram of a TDMA receiver which may be employed to recover TDMA quadrature phase shift keying data and is described in instant assignee's U.S. Pat. application No. 009,973 "TDMA Communications System with Adaptive Equalization" filed on Feb. 2, 1987 on behalf of David E. Borth and is incorporated by reference herein.

The digital signal outputs of the A/D converters 209 and 211, respectively, are applied to in-phase (I) time slot correlator 213 and quadrature (Q) correlator 215, respectively, as well as to their respective signal buffers 217 and 219. I correlator 213 performs a correlation function between all received bits of the input signal and a pre-loaded synchronization word (I sync word) corresponding to the in-phase time slot sync word.

The output of I correlator 213 is a digital bit stream representing the sample-by-sample correlation of the received data with the stored synchronization word replica for the timeslot. The correlation function exhibits a peak when the I sync word is located in the received sample data. In the same way, Q correlator 215 performs a correlation function between the pre-stored quadrature Q sync word from memory 221 and the sampled quadrature (Q) input.

The outputs of correlators 213 and 215 are applied to squaring blocks 223 and 225, respectively. The squaring block output signals represent the squared values of the separate I and Q correlation operations respectively. The squaring block outputs are then applied to summing block 227. The I and Q correlation signals are summed together to form a squared envelope signal which represents the sum of squares of the correlation signal. The squared envelope of the correlation signal makes an explicit determination of the phase ambiguity unnecessary. Thus, without resolving any ambiguity, a large amplitude signal output from summing block 227 represents a possible start location for a particular timeslot.

The output of summing block 227 is then routed to time slot detector 229, wherein the summed correlation signal is compared with a predetermined threshold value. This threshold value represents the minimum allowable correlation value which would represent a detected timeslot. If the summed output is greater than the threshold value, a time slot detect signal is generated and applied to system timing controller 231.

Timing controller 231 functions as a phase-locked loop (PLL), using a stable timing reference to validate the timeslot detect signal and provide a validated detect output signal. The validated timeslot detect signal is applied to AND gate 233 along with a bit clock output. The combined timeslot detect/bit clock signal is then routed to the I and Q signal buffers 217 and 219, respectively. Data signals are clocked into signal buffers 217 and 219 using the combined detect/bit clock signal.

In the implementation shown in FIGS. 2A and 2B, a conventional baseband synchronous decision feedback equalizer (DFE) 234 is employed for data signal recovery. The DFE 234 basically consists of two parts: a forward linear transversal filter 235 and a feedback linear transversal filter 237. The forward filter 235 attempts to minimize the mean-square-error (MSE) due to intersymbol interference (ISI), while the feedback filter 237 attempts to remove the ISI due to previously detected symbols.

The decision feedback equalizer 234 structure is adapted at least once each time slot in order to compensate for the effects of the time-varying multipath profile. The equalized and quantized complex data output from quantizer 238 is applied to multiplexer 239 for 2:1 multiplexing together with the data clock and output as an output data word.

Returning to FIG. 1, in a QPSK communication system, a transmitted signal x(t) may be expressed as:

$$x(t) = a(t)\cos\omega_c t + b(t)\sin\omega_c t \quad (1)$$

where $a(t)$ and $b(t)$ are the in-phase and quadrature information signals and $\omega_c$ is the carrier frequency of the QPSK signal in radians/sec.

A frequency-selective (or delay-spread) channel that is, a radio channel subject to multipath interference, may be characterized by an equivalent channel impulse response given by:

$$h(t) = \alpha_0\delta(t - \tau_0) + \alpha_1\delta(t - \tau_1) + \alpha_2\delta(t - \tau_2) + \ldots \quad (2)$$

$$= \sum_{i=0}^{m} \alpha_i\delta(t - \tau_i).$$

where $\alpha_i$ is the amplitude of the i-th resolvable path, $\tau_i$ is the (excess) path delay associated with the i-th resolvable path, and $m+1$ is the total number of resolvable paths.

For a channel input given by equation (1), the output of the equivalent delay-spread channel having the impulse response of equation (2) is essentially constant during any given timeslot, and given by:

$$y(t) = x(t) * h(t) = \int_{-\infty}^{\infty} x(\tau)h(t - \tau)d\tau + \quad (3)$$

$$\int_{-\infty}^{\infty} x(\tau) \sum_{i=0}^{m} \alpha_i \delta(t - \tau - \tau_i) d\tau$$

$$= \sum_{i=0}^{m} \alpha_i \int_{-\infty}^{\infty} x(\tau)\delta(t - \tau - \tau_i)d\tau$$

$$y(t) = \sum_{i=0}^{m} \alpha_i x(t - \tau_i)$$

$$= \sum_{i=0}^{m} \alpha_i [a(t - \tau_i)\cos\omega_c(t - \tau_i) + b(t - \tau_i)\sin\omega_c(t - \tau_i)].$$

It is this signal, y(t), which is input to receiver 103. When the local oscillator reference 105 in the receiver has a phase offset of $\gamma$ with respect to the (direct-path) received QPSK transmission, the receiver local oscillator reference may be given by $\cos(\omega_c t + \gamma)$ and is essentially constant during a TDMA timeslot. (Although the antenna is shown connected to the mixers 107 and 111, it is likely that additional signal processing will be required for higher frequency radio signals. If down-conversion to an intermediate frequency is used, the output frequency of local oscillator may be different). Let UI(t) denote the output of the mixer 107 in the uncorrected in-phase branch of the receiver and let UI'(t) denote the low-pass filtered version of UI(t) output from low pass filter 109. Similarly, let UQ(t) denote the output of the mixer 111 in the uncorrected quadrature phase branch of the receiver and let UQ'(t) denote the low-pass filtered version of UQ(t) from filter 113. UI'(t) and UQ'(t) are subsequently input to signal processor 115 for resolution into I and Q data and then coupled to data signal recovery 117.

UI(t) is given by:

$$UI(t) = \cos(\omega_c t + \gamma) \sum_{i=0}^{m} \alpha_i [a(t - \tau_i)\cos\omega_c(t - \tau_i) + b(t - \tau_i)\sin\omega_c(t - \tau_i)] \quad (4)$$

$$= \sum_{i=0}^{m} \alpha_i [(\tfrac{1}{2})a(t - \tau_i)(\cos\{\gamma + \omega_c\tau_i\} + \cos\{2\omega_c\tau_i\}) + (\tfrac{1}{2})b(t - \tau_i)(\sin\{2\omega_c t + \gamma - \omega_c\tau_i\} - \sin\{\gamma + \omega_c\tau_i\})].$$

The low-pass filtered version UI'(t) of UI(t) is given by:

$$UI'(t) = \sum_{i=0}^{m} (\tfrac{1}{2})\alpha_i[a(t - \tau_i)\cos(\gamma + \omega_c\tau_i) - \quad (5)$$

$$b(t - \tau_i)\sin(\gamma + \omega_c\tau_i)].$$

Similarly UQ(t) is given by:

$$UQ(t) = \sin(\omega_c t + \gamma) \sum_{i=0}^{m} \alpha_i[a(t - \tau_i)\cos\omega_c(t - \tau_i) + \quad (6)$$

$$b(t - \tau_i)\sin\omega_c(t - \tau_i)]$$

$$= \sum_{i=0}^{m} \alpha_i[(\tfrac{1}{2})a(t - \tau_i)(\sin\{2\omega_c t + \gamma - \omega_c\tau_i\} + \sin\{\gamma + \omega_c\tau_i\}) + (\tfrac{1}{2})b(t - \tau_i)(\cos\{\gamma + \omega_c\tau_i\} - \cos\{2\omega_c t + \gamma - \omega_c\tau_i\})]$$

and UQ'(t) is given by:

$$UQ'(t) = \sum_{i=0}^{m} (\tfrac{1}{2})\alpha_i[a(t - \tau_i)\sin(\gamma + \omega_c\tau_i) + \quad (7)$$

$$b(t - \tau_i)\cos(\gamma + \omega_c\tau_i)].$$

Considering the operation of the present invention in mathematical form, it is an important feature that the transmitted signal $x_T(t)$ during the synchronization (or training) phase of the equalizer 115 is a BPSK signal. When transmitted in the I phase it is given by:

$$x_T(t) = a_T(t)\cos\omega_c t \quad (8)$$

where signal $a_T(t)$ (not shown) is a predetermined synchronization sequence with good aperiodic autocorrelation properties, such as one of the Barker sequences.

The uncorrected in-phase and quadrature receiver branch outputs corresponding to the synchronizing transmitted signal $x_T(t)$ may be found by substituting the signal of equation (8) in the received and low pass filtered signals UI'(t) and UQ'(t) of equations (5) and (7) respectively, yielding:

$$UI'_T(t) = \sum_{i=0}^{m} (\tfrac{1}{2})\alpha_i[a_T(t - \tau_i)\cos(\gamma + \omega_c\tau_i)] \quad (9)$$

and, $$UQ'_T(t) = \sum_{i=0}^{m} (\tfrac{1}{2})\alpha_i[a_T(t - \tau_i)\sin(\gamma + \omega_c\tau_i)]. \quad (10)$$

Thus UI'(t) and UQ'(t) are defined during the training phase as "T" as shown in equations (9) and (10).

Figure 3:
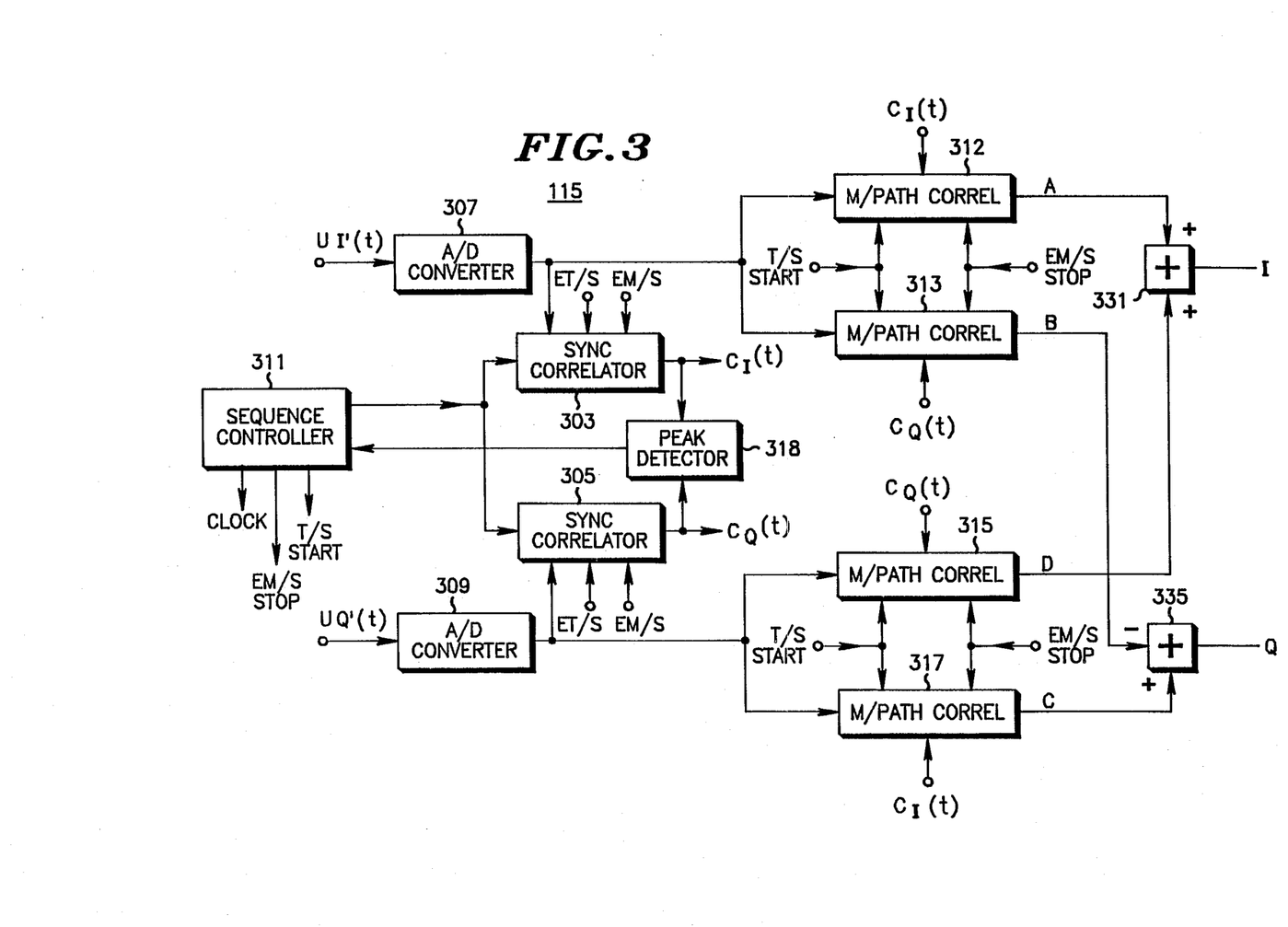
FIG. 3 is a block diagram of a TDMA receiver signal processor which may advantageously employ the present invention.
Figure 5:
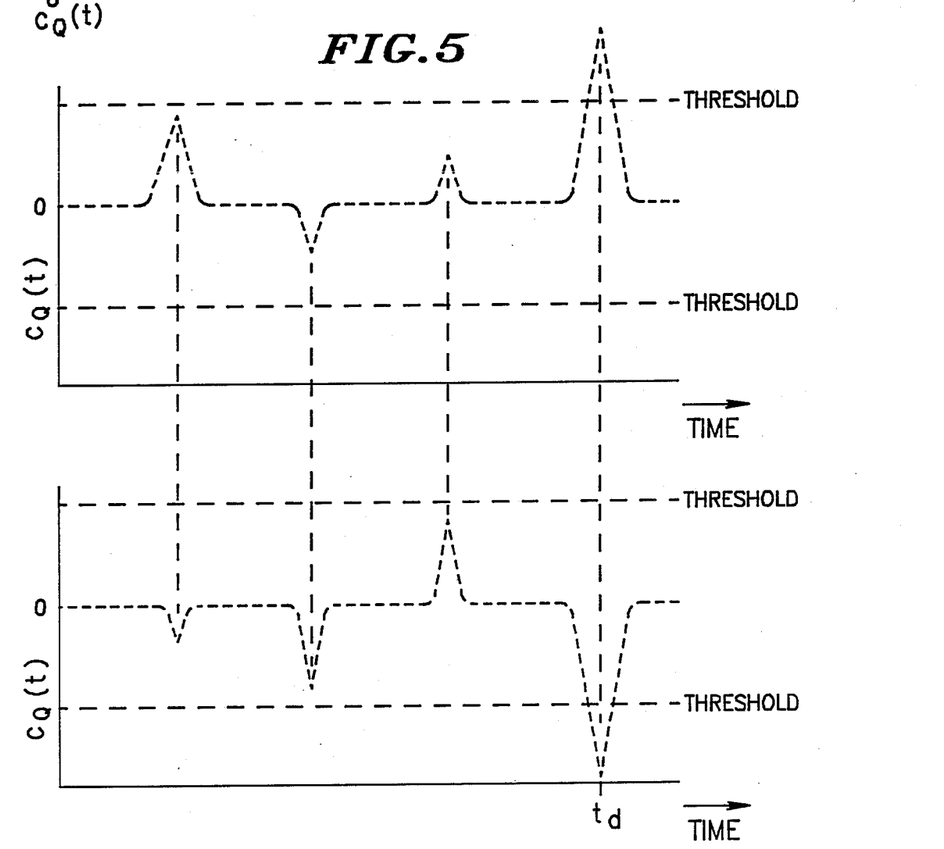
FIG. 5 is a graph of the synchronization correlator outputs $C_I(t)$ and $C_Q(t)$ plotted against time and showing a possible set of outputs including a correlation detection.

Referring now to FIG. 3 which illustrates the preferred embodiment of the present invention in block diagram form, the signals UI'$_T$(t) and UQ'$_T$(t) are applied to synchronization correlators (303 and 305, respectively) via conventional fast A/D converters 307 and 309. In the preferred embodiment, synchronization correlators 303, 305 are 4 by 32 bit digital finite impulse response (FIR) filters programmed to provide signed weighted correlation outputs. Synchronization correlators 303 and 305 are realized by an IMS A100 Cascadable Signal Processor available from Inmos Corp., Colorado Springs, Colo. The outputs of correlators $C_I(t)$ and $C_Q(t)$ which are, in simple terms, weighting factors for each i-th resolvable path, generated during reception of the acquisition sequence, may have the appearance as shown in FIG. 5 and are given by:

$$C_I(t) = \sum_{i=0}^{m} (\tfrac{1}{2})\alpha_i\cos(\gamma + \omega_c\tau_i)\delta(t - \tau_i) \quad (11)$$

and,

-continued $$C_Q(t) = \sum_{i=0}^{m} (\tfrac{1}{2})\alpha_i \sin(\gamma + \omega_c \tau_i)\delta(t - \tau_i). \quad (12)$$

The $\delta$ function in equations (11) and (12) determine when to sample the in-phase and quadrature receiver branch outputs and the $\alpha$ factor provides a weighting for each i-th resolvable pass contribution. In the preferred embodiment, a sequence controller 311 is realized using a conventional microprocessor (such as an MC68020 microprocessor available from Motorola, Inc.) and associated memory and timing dividers. The sequence controller 311 loads a predetermined normalized replica of the acquisition sequence (32 each 4-bit words) stored in the memory of sequence controller 311 into synchronization correlators 303 and 305 prior to the desired TDMA timeslot to be demodulated. TDMA frame timing is determined by the sequence controller 311 employing a conventional framing algorithm to confirm and maintain timeslot acquisition.

Synchronization correlators 303 and 305 each correlate the stored acquisition sequence against the last 32 received A/D samples, and for each new sample perform another complete correlation. While receiving noise or random data, the outputs $C_I(t)$ and $C_Q(t)$ of synchronization correlators 303 and 305 are small numbers of either polarity, emerging at the same rate as the A/D sampling rate (4 per chip interval). If the radio channel were free of noise and not degraded by multipath, then when an acquisition sequence has been received and digitized and entered into the correlators 303 and 305, $C_I(t)$ and $C_Q(t)$ would simultaneously manifest a pair (or sometimes two adjacent pairs) of signed numbers significantly larger than those produced by noise or random data, such that the root sum of squares of these numbers would be proportional to the magnitude of the received signal, and the phase angle $\gamma$ relative to the local reference oscillator is:

$$\gamma = \arc[C_Q(t)/C_I(t)]. \quad (13)$$

In the presence of multipath, each significant path will result in the presence of such a peak pair appearing on $C_I(t)$ and $C_Q(t)$, the signs and magnitudes of each pair of outputs at each peak defining the delay, phase angle, and amplitude contribution of that path to the total, fulfilling the equations (11) and (12). Thus, each sequence of numbers $C_I(t)$ and $C_Q(t)$ are bipolar multipath channel profile estimates, which resemble a classic multipath channel profile, except that they are bipolar.

Figure 4:
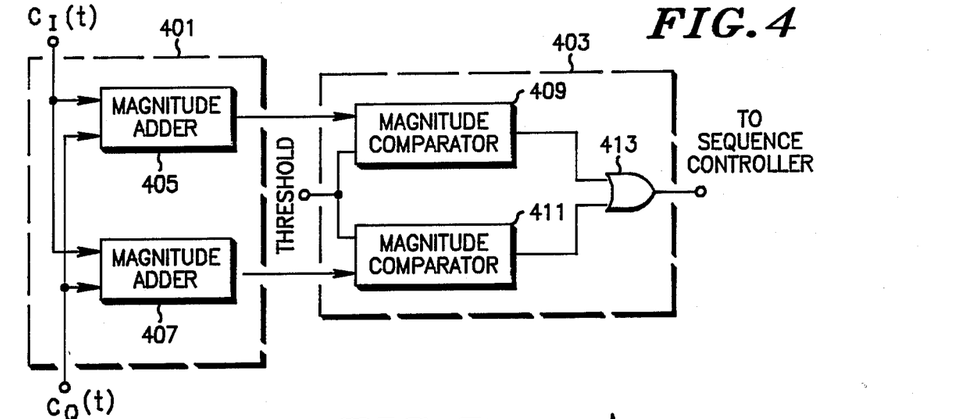
FIG. 4 is a block diagram of the peak detector circuit of the receiver of FIG. 2.

Each of the M/PATH correlators 312, 313, 315, and 317 are FIR filters of at least 2 taps. In the preferred embodiment, each M/PATH correlator is realized by an IMS A100 Cascadable Signal Processor (available from Inmos Corp., Colorado Springs, Colo.) conventionally connected as a correlator. During the acquisition sequence at the beginning of each desired timeslot, $C_I(t)$ is shifted into the TAP control entry of M/PATH correlators 312 and 317, and $C_Q(t)$ is shifted into the TAP control entry of M/PATH correlators 313 and 315. Peak detector 318 is shown in FIG. 4 and comprises a root sum of squares approximator 401 and a threshold detector 403 having an output which signals the sequence controller 311 of the first significant ray of multipath. The sequence controller 311 then provides just enough additional reference port clocks to shift this peak all but through the M/PATH correlators, thereby capturing $C_I(t)$ and $C_Q(t)$ in their respective M/PATH correlators. In the preferred embodiment, the root sum of squares approximator 401 is realized employing a magnitude adder 405 which adds $|C_I|(t)$ and $(\tfrac{1}{2})|C_Q|r(t)$ and magnitude adder 407 which adds $|C_Q(t)|$ and $(\tfrac{1}{2})C_I(t)|$. The outputs of magnitude adder 405 and magnitude adder 407 are input to conventional magnitude comparators 409 and 411, respectively, where the root sum of squares approximation is compared to a predetermined threshold to generate an output to the sequence controller 311 (via OR gate 413). This and other approximations to the square root of the sum of the squares may be found in, eg., A.E. Filip, "A Baker's Dozen Magnitude Approximations and Their Detection Statistics," IEEE Transactions on Aerospace and Electronic Systems, vol. AES-12, pp.86–89, Jan. 1976. This output to the sequence controller 311 is shown as $t_d$ in the example of FIG. 5. Thus, the peak detector 318 reports the first significant peak to the sequence controller 311 which, in turn, starts the loading at T/S stop, to thus capture the channel profile in each of the M/PATH correlators.

The four M/PATH correlators (312, 313, 315, and 317 in FIG. 3) thus have the information available to perform equations (14)–(17), below, whose results (A, B, C, and D) appear at the outputs of M/PATH correlators 312, 313, 315, and 317 respectively.

$$A = C_I(t)UI'(t) = \sum_{i=0}^{m} [(\tfrac{1}{4})a(0)\alpha_i^2\cos^2(\gamma + \omega_c\tau_i) - \quad (14)$$

$$(\tfrac{1}{4})b(0)\alpha_i^2\cos(\gamma + \omega_c\tau_i)\sin(\gamma + \omega_c\tau_i)]$$

$$B = C_Q(t)UI'(t) = \quad (15)$$

$$\sum_{i=0}^{m} [(\tfrac{1}{4})a(0)\alpha_i^2\cos(\gamma + \omega_c\tau_i)\sin(\gamma + \omega_c\tau_i) -$$

$$(\tfrac{1}{4})b(0)\alpha_i^2\sin^2(\gamma + \omega_c\tau_i)]$$

$$C = C_I(t)UQ'(t) = \quad (16)$$

$$\sum_{i=0}^{m} [(\tfrac{1}{4})a(0)\alpha_i^2\cos(\gamma + \omega_c\tau_i)\sin(\gamma + \omega_c\tau_i) +$$

$$(\tfrac{1}{4})b(0)\alpha_i^2\cos^2(\gamma + \omega_c\tau_i)]$$

$$D = C_Q(t)UQ'(t) = \sum_{i=0}^{m} [(\tfrac{1}{4})a(0)\alpha_i^2\sin^2(\gamma + \omega_c\tau_i) + \quad (17)$$

$$(\tfrac{1}{4})b(0)\alpha_i^2\cos(\gamma + \omega_c\tau_i)\sin(\gamma + \omega_c\tau_i)]$$

Properly combining the quantities A through D, one obtains the following expressions for the in-phase and quadrature outputs of the receiver at time $t=0$:

$$I = A + D = \sum_{i=0}^{m} (\tfrac{1}{4})a(0)\alpha_i^2(\cos^2\{\gamma + \omega_c\tau_i\} + \quad (18)$$

$$\sin^2\{\gamma + \omega_c\tau_i\})$$

$$= \sum_{i=0}^{m} (\tfrac{1}{4})a(0)\alpha_i^2 = \text{In-phase data}$$

$$Q = C - B = \sum_{i=0}^{m} (\tfrac{1}{4})b(0)\alpha_i^2(\cos^2\{\gamma + \omega_c\tau_i\} + \quad (19)$$

$$\sin^2\{\gamma + \omega_c\tau_i\})$$

$$= \sum_{i=0}^{m} (\tfrac{1}{4})b(0)\alpha_i^2 = \text{Quadrature-phase data.}$$

Conventional adder 331 implements equation (18) to produce the recovered in-phase signal I and adder 335 implements equation (19) to produce the recovered sample form for use in somewhat more elaborate symbol or character correlation.

The outputs I and Q from the adders 331 and 335 may subsequently be applied to a data signal recovery circuit such as the conventional baseband synchronous feedback equalizer described in the aforementioned U.S. patent application Ser, No. 009,973.

It can be seen by following the general input equation (3) through to equations (18) and (19) that the information contained in each of the paths of the multipath signal is *coherently* combined in the receiver, thereby permitting an effective time diversity gain in the receiver. Furthermore, since the sin and cos terms of equations (14) through (17) are cancelled algebraically and trigonometrically, the received signal phase offset $\gamma$ is cancelled.

In the preferred embodiment four M/PATH correlators 312, 313, 315, and 317 operate on 128 samples, or 32 chip intervals so as to accommodate as much as an 8 microseconds variation in the path delays, any one with respect to the others. This also imposes the requirement that the acquisition sequence be of no less than 9 microseconds duration, preferably two to four times that long.

Referring to FIG. 5, a representative graph of the outputs $C_I(t)$ and $C_Q(t)$ time on the other axis. The outputs of the synchronization correlators 303 and 305 have signed responses at each clock pulse but none of the responses exceed the established threshold magnitude until a correlation with the predetermined synchronization sequence $a_T(t)$ is realized. As shown, a correlation is found at time $t_d$.

Figure 6:
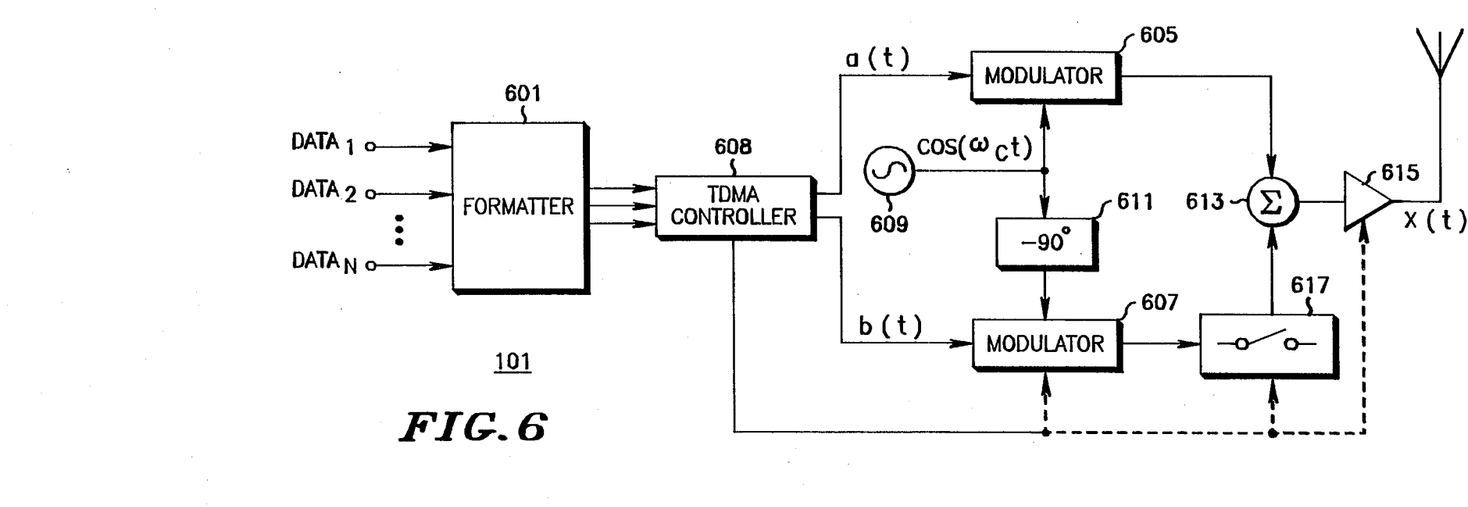
FIG. 6 is a block diagram of a QPSK transmitter which transmits a synchronization sequence during a portion of a TDMA timeslot in accordance with the present invention.

Referring now to FIG. 6, there is shown a block diagram of a QPSK transmitter which may be employed as a fixed site transmitter in a TDMA system. A similar transmitter may be employed as a transmitter in a mobile or portable transceiver. At the fixed site, digital speech or data are input from a number of users and formatted by formatter 601 into individual TDMA message plus synchronization streams. A predetermined number of data bits from one user are interleaved with the synchronization sequence by means of software control in a microprocessor. A representative formatter is further described in the aforementioned U.S. patent application Ser. No. 009,973. Once the data are formatted, the output is coupled to the TDMA controller 603.

Figure 7:
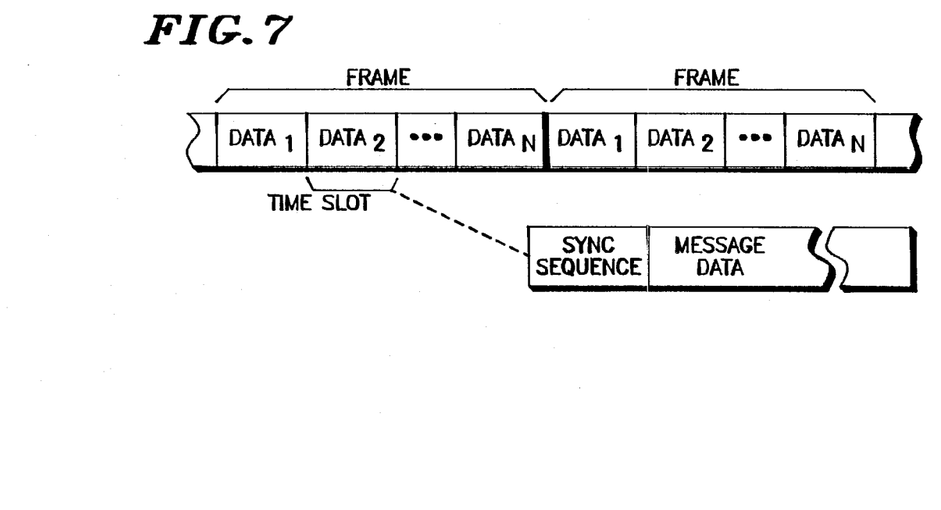
FIG. 7 is an illustration of the TDMA signal format which may be transmitted from the transmitter of FIG. 6.

The TDMA controller 603 performs the function of time-multiplexing each user message with the other user messages to form a TDMA signal. The time-multiplexing function may, preferably, be performed in a software mediated process of a microprocessor but may also be realized via a time-controlled switch (as described in the data sheet of a Motorola MC14416 Time Slot Assigner). The output of the TDMA controller 603 is a signal consisting of N user messages (as shown in FIG. 7) and is applied, as quadrature signals a(t) and b(t), to conventional modulators 605 and 607. Modulator 605 modulates the output of signal oscillator 609 ($\cos\{\omega_c t\}$) with the a(t) signal; modulator 607 modulates the 90° phase shifted (from phase shifter 611) output of signal oscillator 609 with b(t) to create the $b(t)\sin(\omega_c t)$ quadrature signal. The two signals are then summed in conventional summer 613 and applied the transmitter amplification stage 615 for amplification prior to transmission (as $x\{t\}$).

During the period the synchronization sequence is being transmitted for each timeslot, the present invention transmits the synchronization sequence only on one vector of the QPSK modulated signal. In the preferred embodiment, this is accomplished by preventing the $b(t)\sin(\omega_c t)$ from being summed in summer 613. (The transmission of $b(t)\sin(\omega_c t)$ and the suppression of $a(t)\cos(\omega_c t)$ would work equally well and is the choice of the system designer. Furthermore, it may be desirable to transmit the acquisition sequence at some other angle relative to I and Q, for example, simultaneously and identically in both I and Q for a 45° shift. Any angle can be accommodated by operating on the multipath profile estimates $C_I(t)$ and $C_Q(t)$ when applying them to M/PATH correlators).

A conventional signal switch 617 open-circuits the coupling between the modulator 607 and the summer 613 upon a command from the TDMA controller 603 indicating a synchronization sequence period. This signal switch 617 reconnects the modulator 607 and the summer 613 during periods of message data transmission.

Since the turning off of $b(t)\sin(\omega_c t)$ during the acquisition synchronization sequence effectively reduces the transmitter output power by 3 dB during the synchronization sequence, the transmitter may optionally be equipped with the capability of increasing the power gain of the transmitter amplification stage 615. The amplification stage 615, which may be a conventional variable output power amplifier, is switched during the synchronization sequence to an output power 3 dB greater than the output power during the transmission of the message data of each timeslot. In this way, the system gain is maintained during both synchronization sequence and message data transmission.

In summary, then, the present invention describes a unique phase coherent method for transmitting and receiving a QPSK radio signal that has been subject to a multipath fading radio channel. In order that the equalization for reception of a radio signal subject to Rayleigh and multipath fading be adapted for the channel, a training or synchronization signal is transmitted on only one of the vectors of a quadrature phase modulated signal. The random amplitudes and phases of copies of the modulated signal added to the signal by channel multipath are correlated and combined in accordance with a multipath profile signal developed from the synchronization signal. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

We claim:

1. A quadrature phase shift keying (QPSK) time division multiple access (TDMA) radio system conveying a data signal comprising a synchronizing portion and a message portion in a timeslot over a radio channel which introduces multipath distortion and phase variation in the data signal, the system comprising:

means for transmitting a synchronizing portion consisting of a plurality of data bits in a predetermined pattern in only one vector of the data signal;
   means for receiving the data signal subjected to multipath distortion and phase variation; and means, responsive to said one vector synchronizing portion of a received data signal, for compensating the multipath distortion and phase variation of the message portion of said received data signal for the duration of one TDMA timeslot.

2. A quadrature phase shift keying (QPSK) time division multiple access (TDMA) radio system in accordance with claim 1 wherein said means for transmitting further comprises means for amplifying the data signal to an output level.

3. A quadrature phase shift keying (QPSK) time division multiple access (TDMA) radio system in accordance with claim 2 wherein said means for transmitting further comprises means for increasing said output level during the synchronizing portion of the data signal.

4. A method of conveying, by way of a quadrature phase shift keying (QPSK) time division multiple access (TDMA) radio system, a data signal comprising a synchronizing portion and a message portion in a timeslot over a radio channel which introduces multipath distortion and phase variation in the data signal, comprising the steps of:

transmitting a synchronizing portion consisting of a plurality of data bits in a predetermined pattern in only one vector of the data signal;

receiving the data signal subjected to multipath distortion and phase variation; and compensating, in response to said one vector synchronizing portion of a received data signal, the multipath distortion and phase variation of the message portion of said received data signal for the duration of one TDMA timeslot.

5. A method in accordance with the method of claim 4 wherein said transmitting step further comprises the step of amplifying the data signal to an output level.

6. A method in accordance with the method of claim 5 wherein said transmitting step further comprises the step of increasing said output level during the synchronizing portion of the data signal.

7. A time division multiple access (TDMA) radio system having at least one radio coverage area served by a fixed site transmitter conveying a qaudrature phase shift keying (QPSK) modulated data signal comprising a synchronizing portion and a message portion in at least one TDMA timeslot over a radio channel which introduces multipath distortion and phase variation in the data signal to a receiver, the system comprising:

means for transmitting a synchronizing portion consisting of a plurality of data bits in a predetermined pattern in only one vector of the data signal;

means for receiving the data signal subjected to mutlipath distortion and phase variation; and means, responsive to said one vector synchronizing portion of a received data signal, for compensating the multipath distortion and phase variation of the message portion of said received data signal for the duration of one TDMA timeslot.

8. A quadrature phase shift keying (QPSK) time division multiple access (TDMA) radio system in accordance with claim 1 wherein said means for compensating the multipath distortion and phase variation further comprises means for coherently combining at least two rays of multiple signal.

9. A quadrature pahse shift keying (QPSK) time division multiple access (TDMA) radio system in accordance with claim 1 wherein said means for compensating the multipath distortion and phase variation further comprises means for algebraically and trigonometrically cancelling the phase variation.

10. A method in accordance with the method of claim 4 wherein said step of compensating the multipath distortion and phase variation further comprises the step of coherently combining at least two rays of multipath signal.

11. A method in accordance with the method of claim 4 wherein said step of compensating the multipath distortion and phase variation further comprises the step of algebraically and trigonometrically cancelling the phase variation.

12. A time division multiple access (TDMA) radio system in accordance with claim 7 wherein said means for compensating the multipath distortion and phase variation further comprises means for coherently combining at least two rays of multipath signal.

13. A time division multipath access (TDMA) radio system in accordance with claim 7 wherein said means for compensating the multipath distortion and phase variation further comprises means for algebraically and trigonometrically cancelling the phase variation.

* * * * *